US011988186B2

(12) United States Patent
Koppe et al.

(10) Patent No.: US 11,988,186 B2
(45) Date of Patent: May 21, 2024

(54) AIRFLOW GUIDING DEVICE FOR THE SOUND- AND PRESSURE-OPTIMIZED SUPPLY OF AN AIRFLOW TO AN INLET NOZZLE OF A FAN, FAN DEVICE, GENERATOR, AND WIND POWER INSTALLATION

(71) Applicant: Wobben Properties GmbH, Aurich (DE)

(72) Inventors: Malte Koppe, Bremen (DE); Henning Küwen, Oldenburg (DE); Sarah Valentiner, Hamburg (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/972,407

(22) Filed: Oct. 24, 2022

(65) Prior Publication Data
US 2023/0132708 A1    May 4, 2023

(30) Foreign Application Priority Data
Oct. 28, 2021    (EP) ..................................... 21205212

(51) Int. Cl.
*F03D 1/04*    (2006.01)
(52) U.S. Cl.
CPC .......... *F03D 1/04* (2013.01); *F05B 2240/123* (2013.01); *F05B 2250/121* (2013.01); *F05B 2260/96* (2013.01)
(58) Field of Classification Search
CPC . F04D 29/44; F04D 29/66; F03D 1/04; F05B 2240/123; F05B 2260/96
See application file for complete search history.

(56) References Cited

U.S. PATENT DOCUMENTS

| 2,435,645 A | 2/1948 | Bergstrom |
| 8,123,468 B2 | 2/2012 | Shirahama et al. |
| (Continued) | | |

FOREIGN PATENT DOCUMENTS

| EP | 2141360 A2 | 1/2010 | |
| EP | 2626644 A1 * | 8/2013 | ............. F04D 17/16 |
| (Continued) | | | |

*Primary Examiner* — Sabbir Hasan
(74) *Attorney, Agent, or Firm* — Seed IP Law Group LLP

(57) ABSTRACT

An airflow guiding device for the sound- and pressure-optimized supply of an airflow to an inlet nozzle of a fan, in particular a radial fan, wherein the inlet nozzle has a nozzle input opening with an incident flow angle, the airflow guiding device having: a frame device which extends along a longitudinal axis in an axial direction with a height between an inlet opening, through which the airflow flows into the frame device in an operating state, and an outlet opening, through which the airflow flows out of the frame device in the operating state, wherein the inlet opening has an inlet cross section with a minimum inlet cross-sectional width, and the outlet opening has an outlet cross section with a minimum outlet cross-sectional width which corresponds to the minimum inlet cross-sectional width or which is smaller than the minimum inlet cross-sectional width, and the frame device comprises a flow duct which connects the inlet opening and the outlet opening in terms of flow, wherein the outlet opening is configured to be connected in terms of flow to the inlet nozzle of the fan in the operating state, characterized in that the height of the frame device according to the following formula $h \geq (D-d)/(2 \cdot \tan(\beta))$ corresponds to a ratio of a difference of the minimum inlet cross-sectional width and a diameter of the inlet nozzle and double the value of the tangent of the incident flow angle or is greater than the ratio, and a grid element, which is arranged on the inlet opening.

16 Claims, 5 Drawing Sheets

(56) References Cited

U.S. PATENT DOCUMENTS 8,552,576 B2 10/2013 Wobben
9,915,273 B2 * 3/2018 Katsumata ............ F04D 29/162

FOREIGN PATENT DOCUMENTS

EP 2626644 A1 8/2013
EP 3111094 B1 1/2018

* cited by examiner

AIRFLOW GUIDING DEVICE FOR THE SOUND- AND PRESSURE-OPTIMIZED SUPPLY OF AN AIRFLOW TO AN INLET NOZZLE OF A FAN, FAN DEVICE, GENERATOR, AND WIND POWER INSTALLATION

BACKGROUND

Technical Field

The invention relates to an airflow guiding device for the sound- and pressure-optimized supply of an airflow to an inlet nozzle of a fan. The invention furthermore relates to a fan, a generator, and a wind power installation.

Description of the Related Art

Wind power installations emit sound during operation. A reason for this, for example, is that there are vortices of the wind at the rotor blades of the wind power installations. In particular, units within wind power installations also constitute substantial sources of noise during operation. A substantial source of noise includes, for example, fans which generate an airflow for example for cooling an (electric) generator of wind power installations. The conveying and deflecting of the airflow within the generator and in particular at the fans regularly gives rise to vortices which emit sound.

People and animals perceive the sound as a noise with a certain volume in a certain frequency range. The volume is characterized by the sound pressure level. In order to protect people and animals, wind power installations may not exceed a certain volume (limit value) during operation because of legal stipulations. The permissible limit value which a wind power installation may not exceed customarily depends on the location of the wind power installation, at which the latter is operated. For example, the limit value is generally lower in the vicinity of localities than away from localities.

In order to prevent a wind power installation from exceeding the permissible limit value during operation, fans can be operated at a reduced rotational speed. However, this also reduces the cooling power of the fans, and therefore the wind power installation frequently also has to be operated at a reduced rotational speed in order to avoid overheating the generator, in particular the stator and/or the rotor.

In order to improve the efficiency of wind power installations, the hub height and the diameter of the aerodynamic rotor of wind power installations is being increased ever further. However, with the increasing height of the wind power installations, the sound emission thereof generally also increases. A reason for this is not only the higher sound emission at the rotor blades, but also the greater need for cooling power for cooling the generator. Relatively large or a greater number of fans which can provide an airflow with the required cooling power are therefore required. The sound emission of wind power installations can thereby also increase. The starting point is therefore that the previously outlined problem will become more intense in the future, in particular also in view of the average temperature increasing on average.

BRIEF SUMMARY

One embodiment relates to an airflow guiding device for the sound- and pressure-optimized supply of an airflow to an inlet nozzle of a fan, in particular a radial fan, wherein the inlet nozzle has a nozzle input opening with an incident flow angle, the airflow guiding device having: a frame device which extends along a longitudinal axis in an axial direction with a height between an inlet opening, through which the airflow flows into the frame device during operation of the airflow guiding device, and an outlet opening, through which the airflow flows out of the frame device during operation of the airflow guiding device, wherein the inlet opening has an inlet cross section with a minimum inlet cross-sectional width, and the outlet opening has an outlet cross section with a minimum outlet cross-sectional width which is smaller than the minimum inlet cross-sectional width, and the frame device comprises a flow duct which connects the inlet opening and the outlet opening in terms of flow, wherein the outlet opening is designed to be connected in terms of flow to the inlet nozzle of the fan in the operating state.

Provided are an airflow guiding device, a fan, in particular a fan of a wind power installation, a generator, in particular a generator for a wind power installation, and a wind power installation, which reduce or eliminate one or more of the disadvantages mentioned of existing solutions.

The airflow guiding device is configured for the sound-optimized and pressure-optimized supply of an airflow to an inlet nozzle of a fan, in particular a radial fan, wherein the inlet nozzle has a nozzle input opening with an incident flow angle.

Fans, in particular radial fans, are flow machines which convey air or other gases, for example. Such fans conventionally have a fan housing in which a drivable impeller is mounted rotatably. For example, the impeller can be driven with an electric motor. The driven, i.e., rotating, impeller generates an airflow which it sucks up through an input opening of the fan housing (suction side) and conveys same out through an output opening of the fan housing (delivery side). The input opening of the fan housing is conventionally configured as an inlet nozzle with the nozzle input opening.

The inlet nozzle is preferably circular. It can also be preferred for the inlet nozzle to be polygonal, for example rectangular or square. The inlet nozzle is characterized by the shape and size of the opening cross section and the incident flow angle. In particular, the incident flow angle is the incident flow angle at which the air is sucked into the fan at the outer edge of the inlet nozzle. The manufacturers of the fans conventionally predetermine the incident flow angle by the design of the inlet nozzle. The incident flow angle is therefore in particular dependent on the type of fan. The incident flow angle describes, in a preferred manner, the angle at which the air flows into the inlet nozzle. In particular, the incident flow angle is that angle at which the air at the edge of the inlet nozzle flows into the inlet nozzle through the nozzle input opening. The incident flow angle is in particular that angle by which the air flowing into the inlet nozzle at the edge of the inlet nozzle, in particular the nozzle input opening, is inclined with respect to a surface normal which extends orthogonally to the nozzle input opening. In particular, the incident flow angle is that angle by which the air flowing into the inlet nozzle at the edge of the inlet nozzle, in particular the nozzle input opening, is inclined with respect to an axis of rotation of the impeller of the fan, the axis of rotation extending orthogonally to the nozzle input opening.

The airflow guiding device has a frame device which extends along a longitudinal axis with a height in an axial direction between an inlet opening and an outlet opening. The frame device is preferably formed from profiled frame elements. The profiled frame elements comprise, for example, a U-shaped cross section and/or an I-shaped cross section and/or a T-shaped cross section. The frame device is preferably formed from metal, in particular steel or aluminum, and/or plastic. During operation of the airflow guiding device, the airflow flows through the inlet opening into the frame device and flows out of the frame device through the outlet opening. The outlet opening is connected in terms of flow to the inlet nozzle of the fan during operation of the airflow guiding device.

The inlet opening has an inlet cross section with a minimum inlet cross-sectional width, and the outlet opening has an outlet cross section with a minimum outlet cross-sectional width. The minimum outlet cross-sectional width is smaller than the minimum inlet cross-sectional width. The minimum outlet cross-sectional width is in particular a minimum outlet cross-sectional diameter. The minimum inlet cross-sectional width is in particular a minimum inlet cross-sectional diameter.

Furthermore, the frame device comprises a flow duct which connects the inlet opening and the outlet opening in terms of flow. The flow duct is preferably tubular. In particular, the flow duct is cylindrical. It can alternatively be preferred that the flow duct has a polygonal, in particular square or rectangular, cross section.

The height h of the frame device according to the following formula:

$$h \geq \frac{D-d}{2 \cdot \tan(\beta)}$$

corresponds to a ratio of a difference of the minimum inlet cross-sectional width D and a diameter of the inlet nozzle, in particular a nozzle input opening of the inlet nozzle, d and double the value of the tangent of the incident flow angle β or is greater than the ratio.

Furthermore, the airflow guiding device has a grid element which is arranged on the inlet opening. The grid element is in particular a mesh grid. In particular, the grid element is composed of steel. The grid element preferably has a mesh width of at least 0.5 mm, 1 mm, 2 mm, 5 mm, 10 mm or more. Additionally or alternatively, the grid element preferably has a mesh width of at maximum 0.5 mm, 1 mm, 2 mm, 5 mm or 10 mm. In particular, it is preferred that the grid element is composed of a wire mesh or comprises the latter. The wire of the wire mesh preferably has a wire diameter of at least 0.2 mm, 0.5 mm, 1 mm, 1.5 mm, 2 mm or more. Additionally or alternatively, the wire of the wire mesh has a wire diameter of at maximum 0.2 mm, 0.5 mm, 1 mm, 1.5 mm or 2 mm.

The grid element is preferably fastened to the frame device on the outside. The grid element is preferably fastened to the frame device by means of a screw connection and/or clamping connection. Additionally or alternatively, it may be preferred for the grid element to be fastened in an integrally bonded manner, for example with a welded connection, to the frame device.

The arrangement of the grid element on the inlet opening prevents relatively coarse dirt from being sucked into the fan and conveyed into the generator. Furthermore, the grid element prevents relatively large objects, for example a tool, or individuals, from entering the fan. The grid element is also designed to this extent as an engagement guard. The grid element therefore firstly brings about a longer service life and secondly prevents injuries to individuals.

It goes without saying that, depending on the height of the frame device, the incident flow area through which air flows into the airflow guiding device through the grid element at the inlet opening varies. The height of the frame device is preferably selected in such a manner that the incident flow area corresponds to at least 50% of the overall area of the inlet opening. In particular, the height of the frame device is selected in such a manner that the incident flow area corresponds to at least 75% of the overall area of the inlet opening. Particularly preferably, the height of the frame device is selected in such a manner that the incident flow area corresponds to at least 100% of the overall area of the inlet opening.

The invention is based on the finding by the inventors that a small distance between a grid element and the inlet nozzle leads to a comparatively high loss of pressure since the area of the grid element through which the flow passes is comparatively small. The arrangement of a frame device with the height according to the invention leads to the area of the grid element through which the flow passes becoming substantially larger because of the incident flow angle and the loss of pressure becoming correspondingly smaller. The cooling power of a fan can therefore be considerably increased by the arrangement of the airflow guiding device with the fan power remaining the same.

Fans can therefore be operated at a higher rotational speed and can realize a higher cooling power without exceeding the legal limit values.

By means of the arrangement of such an airflow guiding device, the cooling power can therefore be considerably improved such that complicated and costly re-equipment and/or retrofitting of existing wind power installations can be dispensed with.

According to a preferred embodiment of the airflow guiding device, it is provided that the inlet cross section is circular or polygonal, in particular square. Additionally or alternatively, it is provided that the outlet cross section is circular, in particular tubular, or polygonal, in particular square. The outlet cross section preferably corresponds to the inlet cross section. Particularly preferably, the minimum outlet cross-sectional width of the outlet cross section is greater than the diameter of the cross section of a nozzle input opening of a fan of the inlet nozzle.

This has the advantage, in particular if the minimum outlet cross-sectional width of the outlet cross section is greater than the diameter of the cross section of the nozzle input opening of the inlet nozzle, that the air sucked up by the fan is not swirled. Furthermore, this has the effect that the air can be supplied with a sound reduction to the fan.

According to a further preferred development of the airflow guiding device, it is provided that the frame device has a tubular outer wall and/or a tubular inner wall and/or the frame device is double-walled.

This has the advantage that the frame device can be adapted to the cross section of the inlet nozzle of the fan. This minimizes vortices and reduces the emitted sound.

Furthermore, it is provided, according to a preferred development of the airflow guiding device, that the tubular outer wall is annular, wherein preferably the tubular outer wall has a circular or a polygonal, in particular square, cross section. Additionally or alternatively, it is provided that the tubular inner wall is annular, wherein preferably the tubular inner wall has a circular or a polygonal, in particular square, cross section.

Furthermore, it is provided, according to a preferred development of the airflow guiding device, that the inner wall is arranged spaced apart from the outer wall and forms a cavity, in particular an annular cavity, with a cavity volume.

According to a further preferred development of the airflow guiding device, it is provided that the inner wall has at least one through duct which connects the flow duct in terms of flow to the cavity, wherein the inner wall is preferably configured as a perforated sheet wall, wherein particularly preferably the inner wall has a plurality of through ducts which are arranged spaced apart equidistantly from one another.

According to a further preferred development of the airflow guiding device, it is provided that the at least one through duct defines a free inner wall opening cross-sectional area of the inner wall, wherein at least one third, at least a half or at least two thirds of the inner wall is/are formed by the free inner wall opening cross-sectional area. The free inner wall opening cross-sectional area is dependent in particular on the number and the size of the opening cross-sectional area of the at least one through duct.

The inner wall opening cross-sectional area can be realized, for example, by an inner wall which is in the form of a perforated sheet or perforated plate in order to obtain resonator openings distributed as homogeneously as possible over the area. The inner wall preferably has a wall thickness of at least 0.5 cm, 1 cm, 1.5 cm, 2 cm or more.

Furthermore, in a preferred embodiment of the airflow guiding device, it is provided that a sound absorption element is arranged between the inner wall and the outer wall, in particular in the cavity. The sound absorption element is in particular a closed-cell polyethylene foam. Furthermore, the airflow guiding device has the advantage that the emitted sound is considerably minimized.

Furthermore, according to a preferred embodiment, it is provided that the airflow guiding device has a flow rectifier which is arranged on the outlet opening, in particular is arranged upstream of the outlet opening in the flow direction of the airflow. The flow rectifier minimizes vortices in a preferred manner and thereby reduces the emitted sound. Additionally or alternatively, it is provided in this embodiment that a grid element is arranged upstream of the inlet opening in the flow direction of the airflow. It is preferably provided that the grid element covers the inlet cross section of the inlet opening. Additionally or alternatively, it is preferably provided that the grid element has a plurality of inlet ducts which connect the surroundings of the airflow guiding device in terms of flow to the flow duct. Furthermore, additionally or alternatively, it is preferably provided that the at least one inlet duct defines a free inlet opening cross-sectional area of the grid element, wherein at least one third or at least a half or at least two thirds of the grid element is/are formed by the free inlet opening cross-sectional area.

According to a further preferred development of the airflow guiding device, it is provided that the airflow guiding device is configured as a Helmholtz absorber, wherein the cavity is configured as a resonance body. It is preferably provided in this embodiment that the cavity is closed air-tightly in the axial direction in relation to the surroundings and, by means of the outer wall, the cavity is closed air-tightly in the radial direction in relation to the surroundings. Additionally or alternatively, it is preferably provided that the airflow guiding device has a cavity locking unit which is configured to close the cavity air-tightly in the axial direction in relation to the surroundings.

According to a further preferred development of the airflow guiding device, it is provided that the free inner wall opening cross-sectional area of the inner wall, a wall thickness of the inner wall, and the cavity volume of the cavity are designed depending on a dominant frequency f of the fan according to the following formula:

$$f = \frac{c}{2\pi}\sqrt{\frac{S_0}{V_0 \cdot L}}$$

The dominant frequency f is in particular the blade passing frequency BPF which depends on the rotational speed n of the impeller of the fan and on the number of vanes k of the impeller according to the following formula:

$$BPF = \frac{n}{60} * k$$

Provided is a fan device having a fan, in particular a radial fan, with an inlet nozzle which has a nozzle input opening with an incident flow angle, and an airflow guiding device according to the previously described aspect or according to one of the previously described embodiments, which is arranged on the nozzle input opening of the inlet nozzle.

It is preferably provided that the airflow guiding device is arranged upstream of the fan in the flow direction of the airflow. Additionally or alternatively, it is furthermore preferred that the outlet cross section corresponds to a cross section of the nozzle input opening.

According to a further aspect, the object mentioned at the beginning is achieved by a generator according to claim 13. The generator is in particular a generator of a wind power installation. The generator has at least one previously described fan device.

According to a further aspect, the object mentioned at the beginning is achieved by a wind power installation according to claim 14. The wind power installation has a previously described generator and/or a previously described fan device.

For further advantages, embodiment variants and embodiment details of the further aspects and of the possible developments thereof, reference is also made to the description above regarding the corresponding features and developments of the airflow guiding device.

BRIEF DESCRIPTION OF THE SEVERAL VIEWS OF THE DRAWINGS

Preferred exemplary embodiments are described by way of example with reference to the attached figures, in which.

In the figures, identical or substantially functionally identical elements are provided with the same reference signs. General descriptions relate in general to all of the embodiments, unless differences are explicitly indicated.

DETAILED DESCRIPTION

The explanation of the invention on the basis of examples with reference to the figures is substantially schematic, and, for the sake of better illustration, the elements which are explained in the respective figure may be exaggerated in it and other elements may be simplified. Thus, for example, FIG. 1 schematically illustrates a wind power installation 100 as such, and therefore a fan device 5 or the airflow guiding device 1 and a generator cannot be seen in detail.

Figure 1:
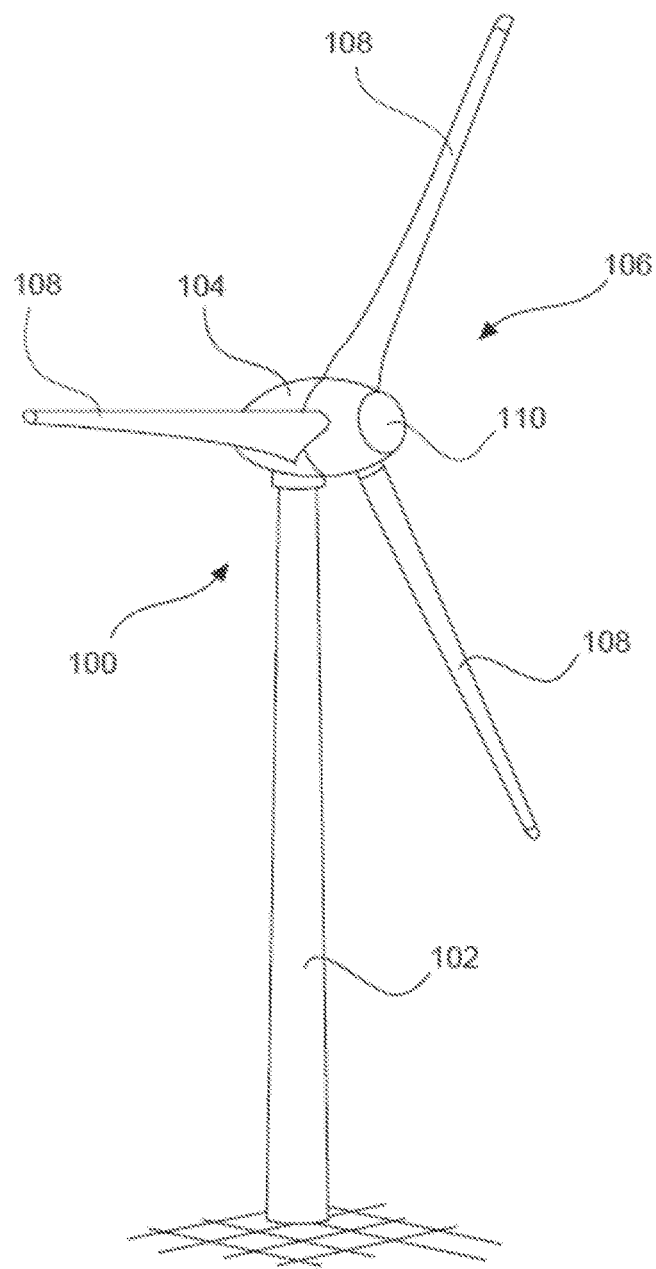
FIG. 1 shows a schematic three-dimensional view of an exemplary embodiment of a wind power installation.

FIG. 1 shows a schematic, three-dimensional view of a wind power installation 100. The wind power installation 100 has a tower 102 and a nacelle 104 on the tower 102. The tower 102 can consist here of tower segments which are arranged on one another. An aerodynamic rotor 106 having three rotor blades 108 and a spinner 110 is provided on the nacelle 104. During the operation of the wind power installation 100, the aerodynamic rotor 106 is caused to rotate by the wind and thus also rotates an electrodynamic rotor of a generator that is coupled directly or indirectly to the aerodynamic rotor 106. The generator is arranged in the nacelle 104 and generates electrical energy. The fan device 5, comprising a fan 3, and the airflow guiding device 1 enable cooling of the generator with a sound-optimized and pressure-optimized airflow supply.

Figure 2:
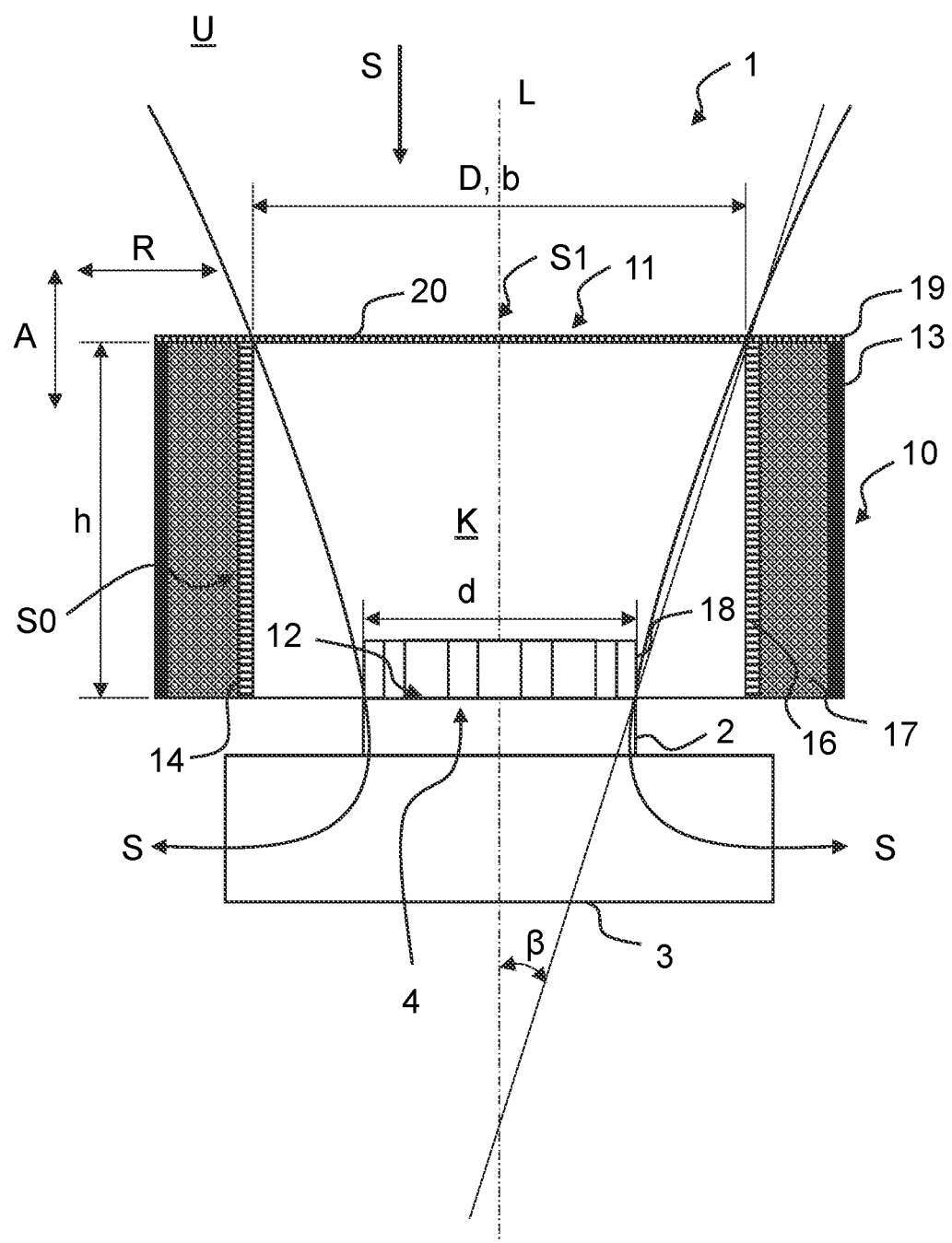
FIG. 2 shows a schematic sectional view in a side view of an exemplary embodiment of a fan device.
Figure 3:
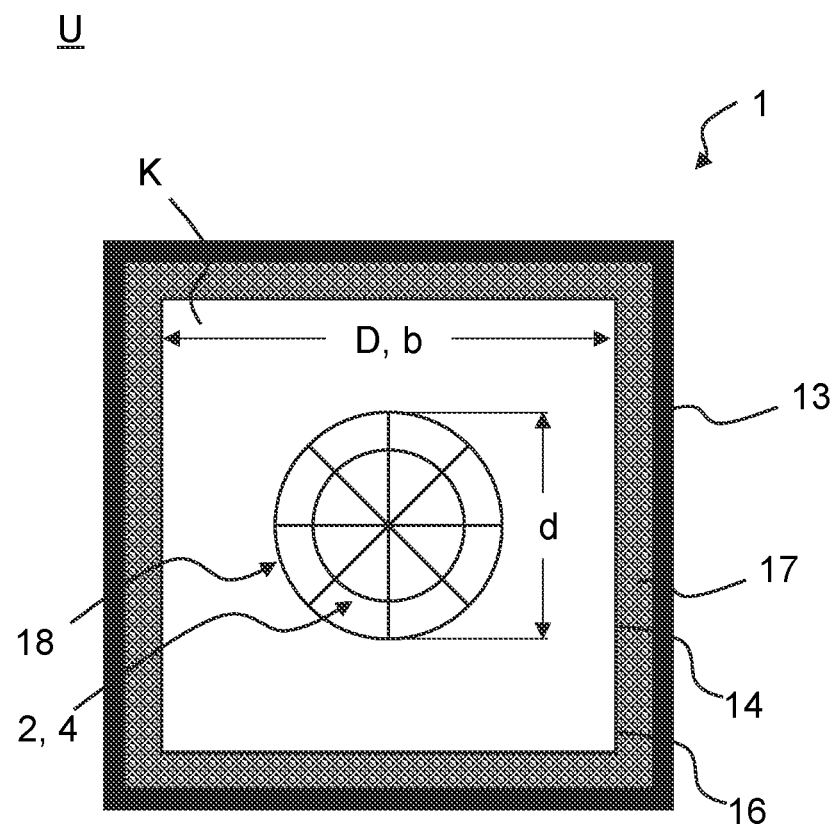
FIG. 3 shows a schematic top view of the fan device illustrated in FIG. 2.

FIGS. 2 and 3 show a preferred exemplary embodiment of a fan device 5 for a generator of a wind power installation 100. FIG. 2 shows a schematic sectional view in a side view of the exemplary embodiment of the fan device 5. FIG. 3 shows a schematic top view of the fan device illustrated in FIG. 2.

The fan device 5 has a radial fan 3 and an airflow guiding device 1. The radial fan 3 has a nozzle input opening 4 with an incident flow angle β. During operation, the radial fan 3 generates an airflow S which flows into the radial fan 3 through the nozzle input opening 4 of the inlet nozzle 2. The incident flow angle β describes in particular the angle at which the air flows at the edge of the nozzle input opening 4 into the inlet nozzle 2. For the sound- and pressure-optimized supply of the airflow S to the inlet nozzle 2 of the radial fan 3, the airflow guiding device 1 is arranged on the nozzle input opening 4 of the inlet nozzle 2 such that the frame device 10 is connected in terms of flow to the radial fan 3.

For the sound- and pressure-optimized supply of the airflow S, the airflow guiding device 1 has a frame device 10 which extends with a height h in the axial direction A along a longitudinal axis L between an inlet opening 11 and an outlet opening 12.

The inlet opening 11 comprises an inlet cross section with a minimum inlet cross-sectional width D and the outlet opening 12 comprises an outlet cross section with a minimum outlet cross-sectional width d. The inlet opening and outlet opening 11, 12 are configured in such a manner that the minimum outlet cross-sectional width b corresponds to the minimum inlet cross-sectional width D of the inlet opening 11. In the preferred embodiment of the airflow guiding device 1, the inlet cross section and the outlet cross section have a square cross-sectional area. It may be preferred for the inlet cross section and the outlet cross section to have a round, in particular a circular, cross-sectional area. The inlet opening 12 is configured in particular corresponding to the nozzle input opening 4 of the inlet nozzle 2. A flow rectifier 18 is preferably arranged upstream of the outlet opening 12 in the flow direction S of the airflow S.

A flow duct K extends between the inlet opening 11 and the outlet opening 12, the flow duct connecting the inlet opening 11 and the outlet opening 12 in terms of flow. The flow duct K preferably has a duct cross section which corresponds to the inlet cross section and/or to the outlet cross section. In particular, the duct cross section has a square or round, in particular a circular, cross-sectional area. The flow duct K has a substantially constant duct cross section along the longitudinal axis L in the axial direction A. The flow duct K preferably has a duct width which corresponds to the minimum inlet cross-sectional width D of the inlet opening 11. It may be preferred for the duct cross section of the flow duct K at the inlet opening 11 to correspond to the inlet cross section with the minimum inlet cross-sectional width D and at the outlet opening 12 to correspond to the outlet cross section with the minimum outlet cross-sectional width b. In particular, it may be preferred that the duct cross section of the flow duct decreases from the inlet opening 11 in the direction of the outlet opening 12. However, it is provided here that the minimum outlet cross-sectional width b is greater than the diameter of the nozzle input opening 4 of the inlet nozzle 2. The flow duct K extends substantially with the height h in the axial direction along the longitudinal axis L.

The frame device 10 is double-walled and has a tubular outer wall 13 and a tubular inner wall 14. In the present embodiment, both the outer wall 13 and the inner wall 14 have a square cross section. The inner wall 14 is arranged within the outer wall 13 in a manner spaced apart therefrom. By this means, an annular cavity 15 with a cavity volume $V_0$ is formed between the outer wall 13 and the inner wall 14. In the present embodiment, a sound absorption element 17 made from a closed-cell polyethylene foam is arranged in the cavity 15 formed between the inner wall 14 and the outer wall 13.

The inner wall 14 is configured as a perforated sheet wall which has a plurality of through ducts 16 which connect the flow duct K to the cavity 15 in terms of flow. The flow ducts 16 are arranged equidistantly from one another, i.e., the distances between adjacent through ducts 16 are identical. The through ducts 16 define a free inner wall opening cross-sectional area $S_0$ of the inner wall 14. In the present case, at least half of the inner wall 14 is formed by the free inner wall opening cross-sectional area $S_0$.

The airflow guiding device 1 furthermore has a grid element 19. The grid element 19 is arranged on the inlet opening 11 upstream of the inlet opening 11 in the flow direction S of the airflow S. The grid element 19 has a plurality of inlet ducts 20 which connect the surroundings U of the airflow guiding device 1 in terms of flow to the flow duct K. The inlet ducts 20 preferably form a free inlet opening cross-sectional area $S_1$ of the grid element 19 such that more than two thirds of the grid element 18 are formed by the free inlet opening cross-sectional area $S_1$.

Figure 4:
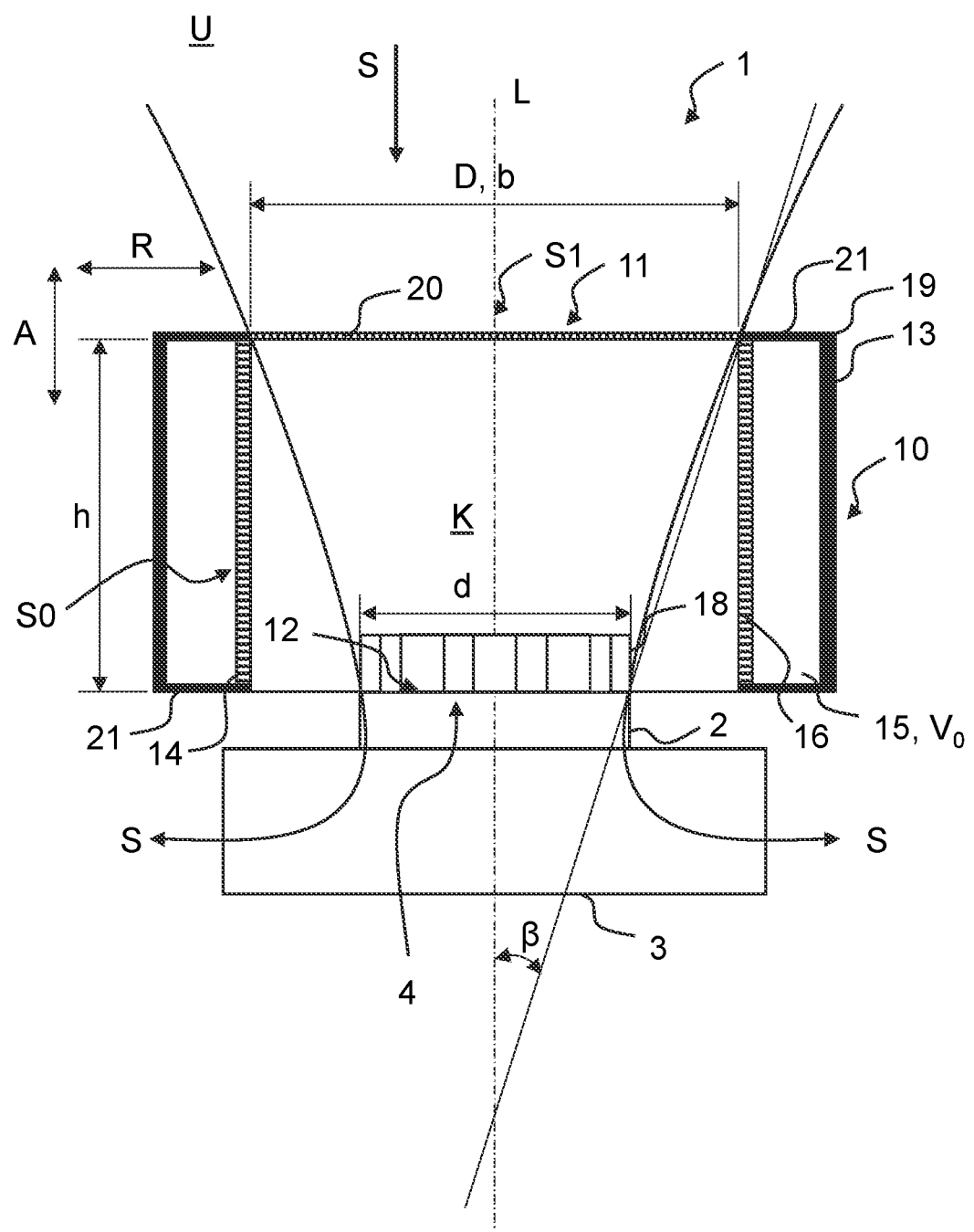
FIG. 4 shows a schematic sectional view in a side view of a further exemplary embodiment of a fan device.
Figure 5:
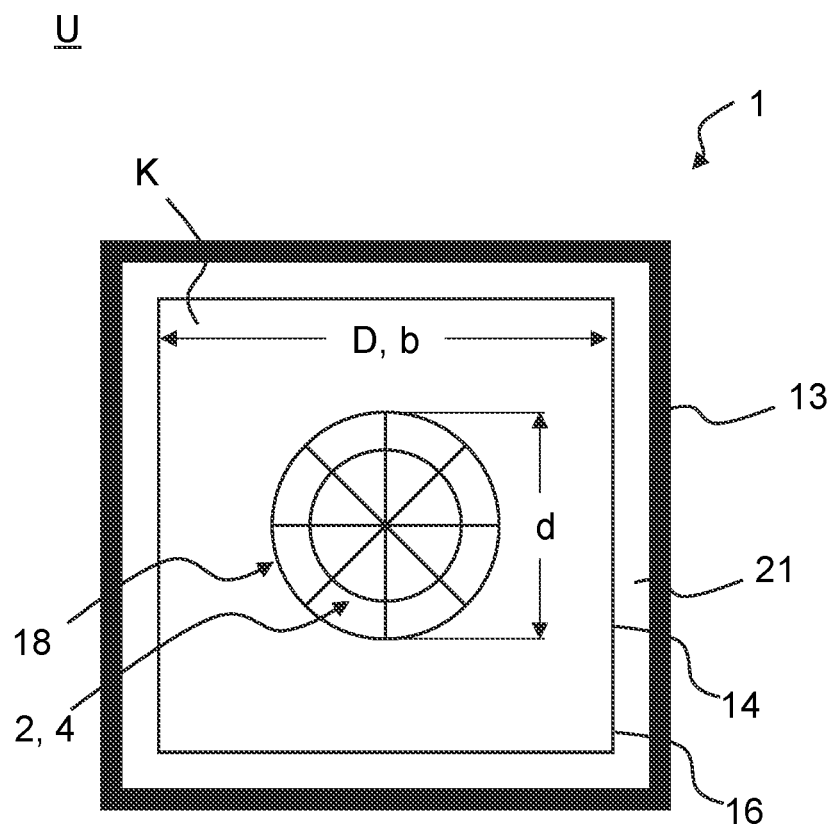
FIG. 5 shows a schematic top view of the fan device illustrated in FIG. 4.

FIGS. 4 and 5 show a further preferred exemplary embodiment of a fan device 5 for a generator of a wind power installation 100. FIG. 4 shows a schematic sectional view in a side view of the further exemplary embodiment of the fan device 5. FIG. 4 shows a schematic top view of the fan device 5 which is illustrated in FIG. 5.

The exemplary fan device 5 illustrated in FIGS. 4 and 5 is substantially based on the fan device 5 which is illustrated by way of example in FIGS. 2 and 3. The exemplary fan device 5 illustrated in FIGS. 4 and 5 differs essentially from the fan device 5 illustrated by way of example in FIGS. 2 and 3 in that no sound absorption element 17 is arranged in the cavity 15.

In this preferred embodiment, the airflow guiding device 1 is configured as a Helmholtz absorber, wherein the cavity 15 is configured as a resonance body. For this purpose, the cavity 15 is closed air-tightly in a radial direction R and in the axial direction A in relation to the surroundings U. Furthermore, a cavity locking unit 21 is provided which closes the cavity 15 air-tightly in the axial direction A on the side of the inlet opening 11 in relation to the surroundings U. On the side of the outlet opening 12, a base plate which has the outlet opening 12 closes the cavity 15 air-tightly on the side of the outlet opening 12 in the axial direction A in relation to the surroundings U.

In the case of the airflow guiding device 1 configured here as a Helmholtz absorber, the free inner wall opening cross-sectional area $S_0$ and a wall thickness of the inner wall 14 and the cavity volume $V_0$ of the cavity are designed depending on a dominant frequency f of the fan 3 according to the following formula $$f = \frac{c}{2\pi} \sqrt{\frac{S_0}{V_0 \cdot L}}$$

LIST OF DESIGNATIONS

1 Airflow guiding device
2 Inlet nozzle
3 Fan
4 Nozzle input opening
5 Fan device
10 Frame device
11 Inlet opening
12 Outlet opening
13 Outer wall
14 Inner wall
15 Cavity
16 Through duct
17 Sound absorption element
18 Flow rectifier
19 Grid element
20 Inlet duct
21 Cavity locking unit
100 Wind power installation
102 Tower
104 Nacelle
106 Rotor
108 Rotor blades
109 Stator
110 Spinner
β Incident flow angle
A Axial direction
b Minimum outlet cross-sectional width
D Minimum inlet cross-sectional width
d Diameter of the inlet nozzle or of the nozzle input opening
h Height of the frame device
$V_0$ Cavity volume
K Flow duct
L Longitudinal axis
R Radial direction
S Airflow/flow direction of the airflow
$S_0$ Free inner wall opening cross-sectional area
$S_1$ Free inlet opening cross-sectional area
U Surroundings The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An airflow guiding device for reducing sound and pressure supply of an airflow to an inlet nozzle of a fan, wherein the inlet nozzle has a nozzle input opening with an incident flow angle, the airflow guiding device comprising:
a frame device extending along a longitudinal axis in an axial direction with a height between an inlet opening, through which the airflow flows into the frame device during operation of the airflow guiding device, and an outlet opening, through which the airflow flows out of the frame device during operation of the airflow guiding device, wherein:
the inlet opening has an inlet cross section with a minimum inlet cross-sectional width,
the outlet opening has an outlet cross section with a minimum outlet cross-sectional width which corresponds to the minimum inlet cross-sectional width or which is smaller than the minimum inlet cross-sectional width,
the frame device comprises a flow duct which fluidly connects the inlet opening and the outlet opening,
the outlet opening is designed to be fluidly connected to the inlet nozzle of the fan during operation of the airflow guiding device,
the height (h) of the frame device according to the following formula:

$$h \geq \frac{D-d}{2 \cdot \tan(\beta)}$$

corresponds to a ratio of a difference of the minimum inlet cross-sectional width (D) and a diameter of the inlet nozzle (d) and double the value of the tangent of the incident flow angle (β) or is greater than the ratio, and
a grid element is arranged on the inlet opening.

2. The airflow guiding device according to claim 1, wherein:
the inlet cross section is circular shaped or polygonal shaped, and/or
the outlet cross section is circular shaped or polygonal shaped, wherein the outlet cross section corresponds to a cross section of the nozzle input opening.

3. The airflow guiding device according to claim 1, wherein the frame device has a tubular outer wall and a tubular inner wall.

4. The airflow guiding device according to claim 3, wherein:
the tubular outer wall is annular, wherein the tubular outer wall has a circular shaped or a polygonal shape in cross section, and/or
the tubular inner wall is annular, wherein the tubular inner wall has a circular shaped or a polygonal shape in cross section.

5. The airflow guiding device according to claim 3, wherein the inner wall is arranged spaced apart from the outer wall and forms a cavity with a cavity volume.

6. The airflow guiding device according to claim 5, wherein the inner wall has at least one through duct fluidly connecting the flow duct to the cavity, wherein the inner wall is configured as a perforated sheet wall, wherein the inner wall has a plurality of through ducts arranged spaced apart and equidistantly from one another.

7. The airflow guiding device according to claim 6, wherein the at least one through duct defines a free inner wall opening cross-sectional area of the inner wall, wherein at least one third of the inner wall is formed by the free inner wall opening cross-sectional area.

8. The airflow guiding device according to claim 5, wherein a sound absorption element is arranged between the inner wall and the outer wall and in the cavity.

9. The airflow guiding device according to claim 1 comprising:
- a flow rectifier arranged on the outlet opening upstream of the outlet opening in the flow direction of the airflow, and/or
- wherein a grid element is arranged upstream of the inlet opening in the flow direction of the airflow.

10. The airflow guiding device according to claim 9, wherein:
- the grid element covers the inlet cross section of the inlet opening, and/or
- the grid element has a plurality of inlet ducts fluidly connecting the surroundings of the airflow guiding device to the flow duct, and/or
- the at least one inlet duct defines a free inlet opening cross-sectional area of the grid element, wherein at least one third of the grid element is formed by the free inlet opening cross-sectional area.

11. The airflow guiding device according to claim 5, wherein the airflow guiding device is configured as a Helmholtz absorber, wherein the cavity is configured as a resonance body,
- wherein the cavity is closed air-tightly in the axial direction with respect to the surroundings and, by the outer wall, the cavity is closed air-tightly in the radial direction in relation to the surroundings, and/or
- further comprising a cavity locking unit configured to close the cavity air-tightly in the axial direction in relation to the surroundings.

12. The airflow guiding device according to claim 7, wherein the free inner wall opening cross-sectional area of the inner wall, a wall thickness of the inner wall, and the cavity volume of the cavity are designed depending on a dominant frequency f of the fan according to the following formula:

$$f = \frac{c}{2\pi}\sqrt{\frac{S_0}{V_0 \cdot L}}$$

13. A fan device of a wind power installation, comprising:
- a radial fan with an inlet nozzle having a nozzle input opening with an incident flow angle, and
- the airflow guiding device according to claim 1 arranged at the nozzle input opening of the inlet nozzle.

14. The fan device according to claim 13, wherein the airflow guiding device is arranged upstream of the fan in the flow direction of the airflow, and/or
- the outlet cross section corresponds to a cross section of the nozzle input opening.

15. A generator of a wind power installation comprising at least one fan device according to claim 13.

16. A wind power installation, comprising:
- a tower,
- a nacelle, and
- the generator according to claim 15.

* * * * *